United States Patent
Takahashi

(10) Patent No.: US 6,642,500 B2
(45) Date of Patent: Nov. 4, 2003

(54) SIGNAL PROCESSING APPARATUS WHICH PERFORMS LOGARITHMIC COMPRESSIONS

(75) Inventor: Hidekazu Takahashi, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/772,073

(22) Filed: Jan. 30, 2001

(65) Prior Publication Data

US 2001/0028027 A1 Oct. 11, 2001

(30) Foreign Application Priority Data

Feb. 1, 2000 (JP) .................................... 2000-023947

(51) Int. Cl.[7] .............................................. H01J 40/14
(52) U.S. Cl. ................................... 250/214; 250/201.2
(58) Field of Search ............................. 250/214.6, 238, 250/201.2

(56) References Cited

U.S. PATENT DOCUMENTS

| | | | | |
|---|---|---|---|---|
| 3,600,589 A | * | 8/1971 | Hanson | 250/214 |
| 3,679,905 A | * | 7/1972 | Watanabe | 250/214 |
| 3,843,880 A | * | 10/1974 | Tsuchiyasu | 250/214 |
| 4,633,077 A | * | 12/1986 | Ikari et al. | 250/214 |
| 4,758,797 A | * | 7/1988 | Wermuth | 330/149 |
| 4,808,811 A | * | 2/1989 | Kumakura et al. | 250/214 |
| 5,260,738 A | | 11/1993 | Yamagishi et al. | 354/413 |
| 5,990,718 A | * | 11/1999 | Tchamov et al. | 327/227 |
| 6,043,525 A | * | 3/2000 | Chen | 257/292 |
| 6,262,623 B1 | * | 7/2001 | Molnar | 327/552 |

* cited by examiner

Primary Examiner—Stephone B. Allen
Assistant Examiner—Eric J Spears
(74) Attorney, Agent, or Firm—Fitzpatrick, Cella, Harper & Scinto

(57) ABSTRACT

A signal processing apparatus includes a photoelectric conversion element, a compression device which logarithmically compresses an output from the photoelectric conversion element, an expansion device which exponentially expands an output from the compression device, and an integral device which integrates an output from the expansion device, wherein each of a transistor which performs logarithmic compression in the compression device and a transistor which performs exponential expansion in the expansion device is a MOS transistor, where a gate and drain of the MOS transistor of the compression device are connected together, and a source potential and a well potential of the MOS transistor of the compression device are provided with a common potential.

12 Claims, 4 Drawing Sheets

SIGNAL PROCESSING APPARATUS WHICH PERFORMS LOGARITHMIC COMPRESSIONS

BACKGROUND OF THE INVENTION

1. Field of the Invention

The present invention relates to a photoelectric conversion apparatus having a logarithmic compression function.

2. Related Background Art

A conventional photoelectric conversion apparatus for modulating electronic flash light from a camera has used a circuit as shown in FIG. 1. In FIG. 1, a photodiode 1 for receiving electronic flash light is connected to an operational amplifier 2. An npn bipolar transistor 10 logarithmically compresses a photocurrent $I_P$. An npn bipolar transistor 11 applies a gain to a logarithmically compressed signal to expand it. An integral capacitor 7 integrates an expansion current I. This photoelectric conversion apparatus further comprises a comparator 8 and monitoring voltage follower 9.

Letting $I_P$ be the photocurrent of the photodiode 1, an output $V_1$ from the logarithmic compression circuit is given by $$V_1 = V_c - \frac{kT}{q} \ln \frac{I_p}{I_s} \quad (1)$$

where k is the Boltzmann constant, T is the temperature, q is the elementary charge, and $I_S$ is the reverse saturation current of a bipolar transistor $Q_1$.

The output of the logarithmic compression circuit is connected to the emitter of an expansion transistor $Q_2$. Letting $V_{DAC}$ be the base potential of the expansion transistor, the current I flowing through the expansion transistor $Q_2$ is given by $$I = I_S \exp \frac{q(V_{DAC} - V_1)}{kT} = I_P \exp \frac{q}{kT}(V_{DAC} - V_C) \quad (2)$$

The expansion current I gains by the potential difference between $V_{DAC}$ and $V_C$. For example, for $V_{DAC} - V_C = 18$ mV, the expansion current is double the photocurrent $I_P$.

However, the prior art adopts bipolar transistors as elements for logarithmically compressing, expanding, and integrating a current, so the following problems occur.

a. The bipolar technique is necessary, and is less compatible with a CMOS sensor (sensor manufactured by a CMOS process).

b. The cost is high in terms of the number of masks and the process.

SUMMARY OF THE INVENTION

It is the first object of the present invention to provide an apparatus which can be manufactured by a CMOS process.

It is the second object of the present invention to provide a multifunctional CMOS sensor capable of reducing the cost by integrating a modulated light circuit in another CMOS sensor, e.g., an autofocus sensor on a single chip.

To achieve the above objects, according to an aspect of the present invention, there is provided a signal processing apparatus comprising:

a photoelectric conversion element;

a compression device which logarithmically compresses an output from the photoelectric conversion element;

an expansion device which exponentially expands an output from the compression device; and an integral device which integrates an output from the expansion device, wherein a transistor which integrates logarithmic compression in the compression device and a transistor which performs exponential expansion in the expansion device are MOS transistors respectively.

According to another aspect of the present invention, there is provided a signal processing apparatus comprising:

a photoelectric conversion element;

a compression device which logarithmically compresses an output from the photoelectric conversion element; and an integral device which integrates an output from the expansion device, wherein a transistor which performs logarithmic compression in the compression device and a transistor which performs exponential expansion in the expansion device are MOS transistors respectively.

According to still another aspect of the present invention, there is provided a signal processing apparatus formed by a CMOS process on a single semiconductor substrate, comprising:

a modulated light circuit including:

a compression device which logarithmically compresses an output from a photoelectric conversion element;

an expansion device which exponentially expands an output from the compression device; and an integral device which integrates an output from the expansion device, wherein a transistor which performs logarithmic compression in the compression device and a transistor which performs exponential expansion in the expansion device are MOS transistors respectively; and a focus adjustment circuit.

The above and other objects and features of the present invention will be apparent from the following description in conjunction with the accompanying drawings.

DETAILED DESCRIPTION OF THE PREFERRED EMBODIMENTS

Figure 1:
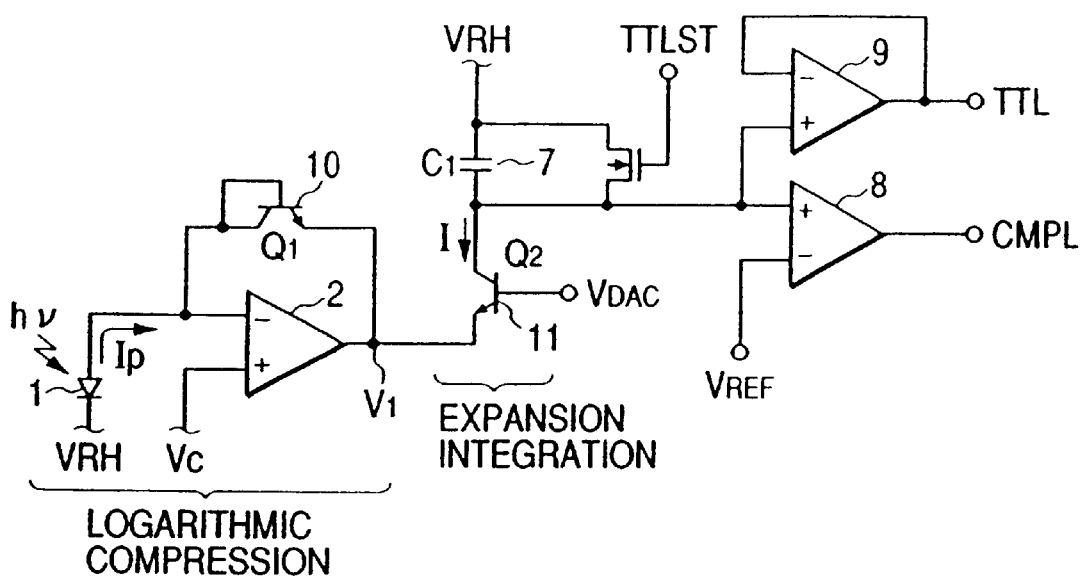
FIG. 1 is a circuit diagram showing the prior art.
Figure 2:
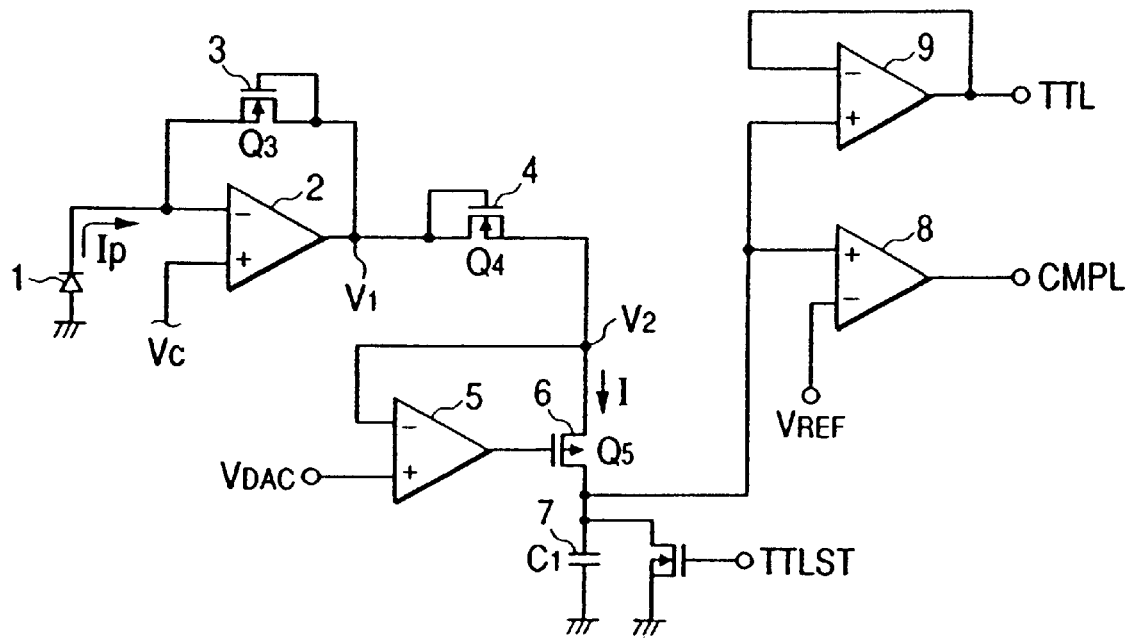
FIG. 2 is a circuit diagram showing the first embodiment.

FIG. 2 is a circuit diagram showing a photoelectric conversion apparatus as the first embodiment of the present invention. In FIG. 2, a photodiode 1 photoelectrically converts electronic flash light. An operational amplifier 2 is formed with a CMOS structure. An nMOS transistor 3 performs logarithmic compression, and operates in a subthreshold region. An nMOS transistor 4 performs expansion operation, and similarly operates in the subthreshold region. An operational amplifier 5 is formed with a CMOS structure, and a pMOS transistor 6 negatively feeds back a current to the operational amplifier 5. An integral capacitor 7 integrates an expanded current, a comparator 8 compares the potential of an integrated charge with a reference potential $V_{REF}$, and a voltage follower circuit 9 monitors the potential of the integral capacitor 7.

When the gate voltage of the MOS transistor is a threshold voltage or less, a subthreshold current flows therethrough. This current value $I_D$ is given by $$I_D = I_{DD} \exp\left[\frac{q}{nkT}(V_G - V_S - V_T)\right] \quad (3)$$

$$I_{DD} = \frac{W\mu_n C_O}{nL}\left(\frac{nkT}{q}\right)^2 \exp(-1) \quad (4)$$

where $V_G$ is the gate voltage, $V_D$ is the drain voltage, $V_S$ is the source voltage, $V_T$ is the threshold voltage, W is the gate width, L is the gate length, $\mu_n$ is the electron mobility, $C_O$ is the gate capacitance, $C_D$ is the capacitance of the depletion layer, of which $C_O$ and $C_D$ are given by $$n = \frac{C_O + C_D}{C_O} \quad (5)$$

In FIG. 2, when light is incident on the photodiode 1, a photocurrent $I_P$ proportional to the light intensity is generated. An output from the logarithmic compression circuit is given by $$V_1 = V_C + V_T + \frac{nkT}{q}\ln\left(\frac{I_P}{I_{DO}}\right) \quad (6)$$

The photocurrent $I_P$ is logarithmically converted and output.

A source potential $V_2$ of an expansion nMOS transistor $Q_4$ is negatively fed back by the operational amplifier 5 and a pMOS transistor $Q_5$, which operate to cause the potential $V_2$ to be equal to $V_{DAC}$. Hence, a current I flowing through the expansion nMOS transistor $Q_4$ is given by $$I = I_{DO}\exp\left[\frac{q}{nkT}(V_1 - V_{DAC} - V_T)\right] \quad (7)$$

$$I = I_P\exp\left(\frac{V_c - V_{DAC}}{nV_T}\right) \quad (8)$$

Accordingly, the expansion current I gains by the potential difference between $V_{DAC}$ and $V_C$.

The first embodiment implements a modulated light circuit using only MOS transistors. The number of masks and the process cost thus can be reduced to attain a low-cost modulated light sensor.

The circuit of the first embodiment is constituted by nMOS transistors, but the same effects of the present invention can also be obtained using pMOS transistors depending on the polarity of the photodiode. The photodiode may be formed on the same substrate or may be discretely externally connected.

Figure 3:
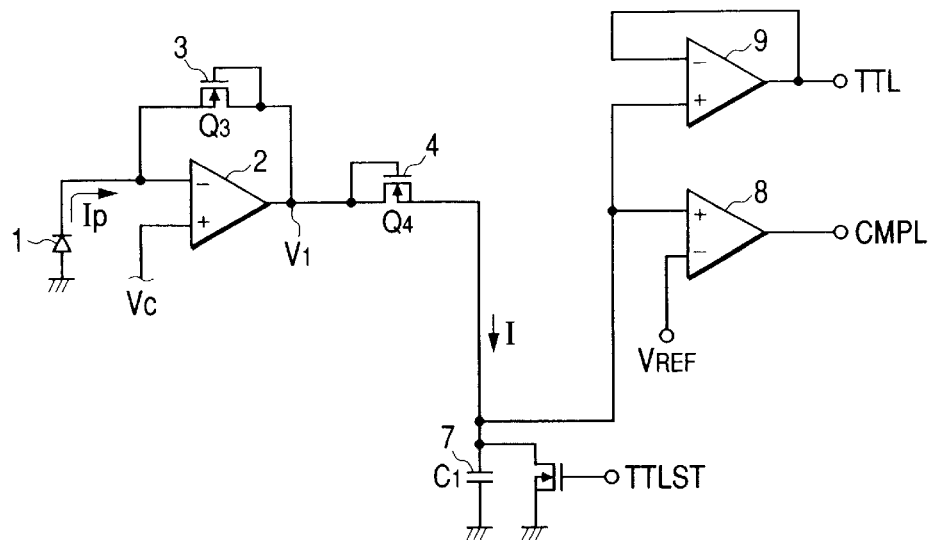
FIG. 3 is a circuit diagram showing the second embodiment.

FIG. 3 shows the circuit of a photoelectric conversion apparatus as the second embodiment of the present invention. In the second embodiment, only charge integration is performed without expansion of a logarithmically compressed signal.

The potential in an integral capacitor can be approximated by $$V_2 = V_C + \frac{nkT}{q}\ln\left(\frac{q}{nkTC}\int I_P dt\right) \quad (9)$$

The potential $V_2$ is a logarithmically compressed value of the time integral value of the photocurrent $I_P$.

The second embodiment enables simple integration which does not include expansion. Particularly when the precision can be poor, the number of circuits can be decreased to further reduce the cost.

Figure 4:
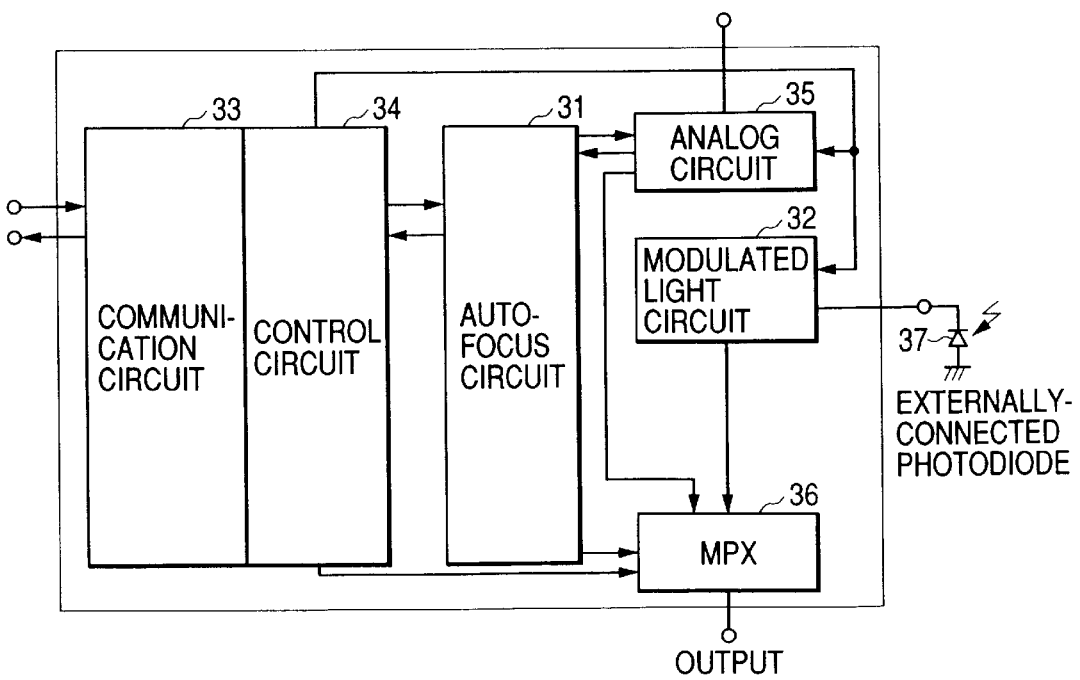
FIG. 4 is a block diagram showing the arrangement of the third embodiment.

FIG. 4 shows the arrangement of a multifunctional CMOS sensor as the third embodiment of the present invention. In the third embodiment, a modulated light circuit is integrated on the same substrate as an autofocus sensor.

Figure 5:
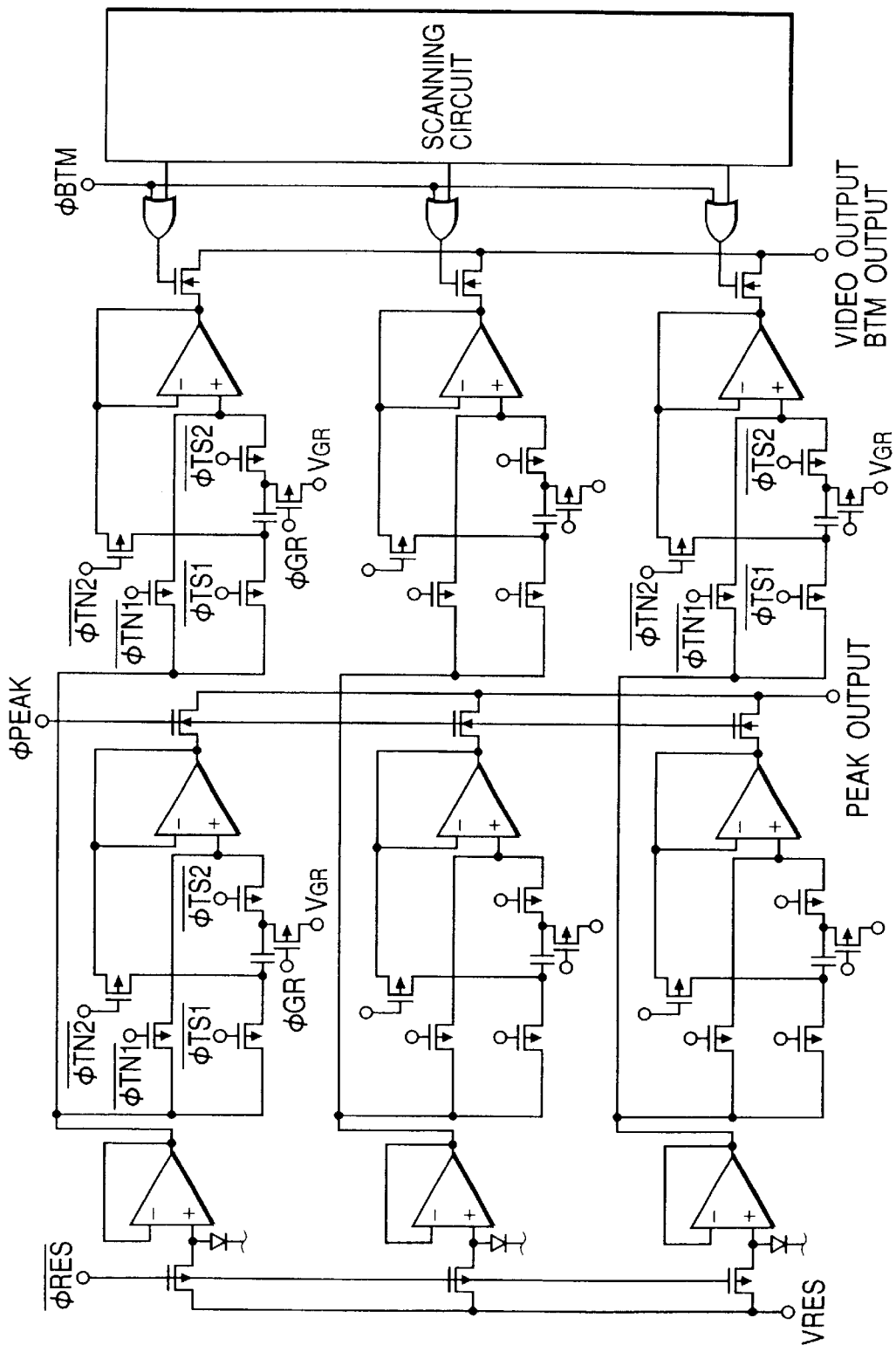
FIG. 5 is a circuit diagram showing an autofocus circuit.

FIG. 5 shows an example of an autofocus circuit block 31 of FIG. 4. In FIG. 4, a modulated light circuit 32 is identical to each of those described in the first and second embodiments. A communication circuit 33 communicates with an external CPU. A control circuit 34 controls each internal circuit of the IC. An analog circuit 35 is formed with an auto gain control circuit, amplifier circuit, intermediate power supply, band gap circuit, or the like. A multiplexer circuit 36 selects and externally outputs each output. An externally-connected photodiode 37 is used as a photodiode for the modulated light circuit.

In the third embodiment, all the circuits are manufactured by a CMOS process, which can implement a low-cost multifunctional CMOS sensor.

The autofocus sensor and modulated light sensor, which are provided separately in the prior art, can be integrated into one, thereby reducing the cost and size of the camera.

Figure 6:
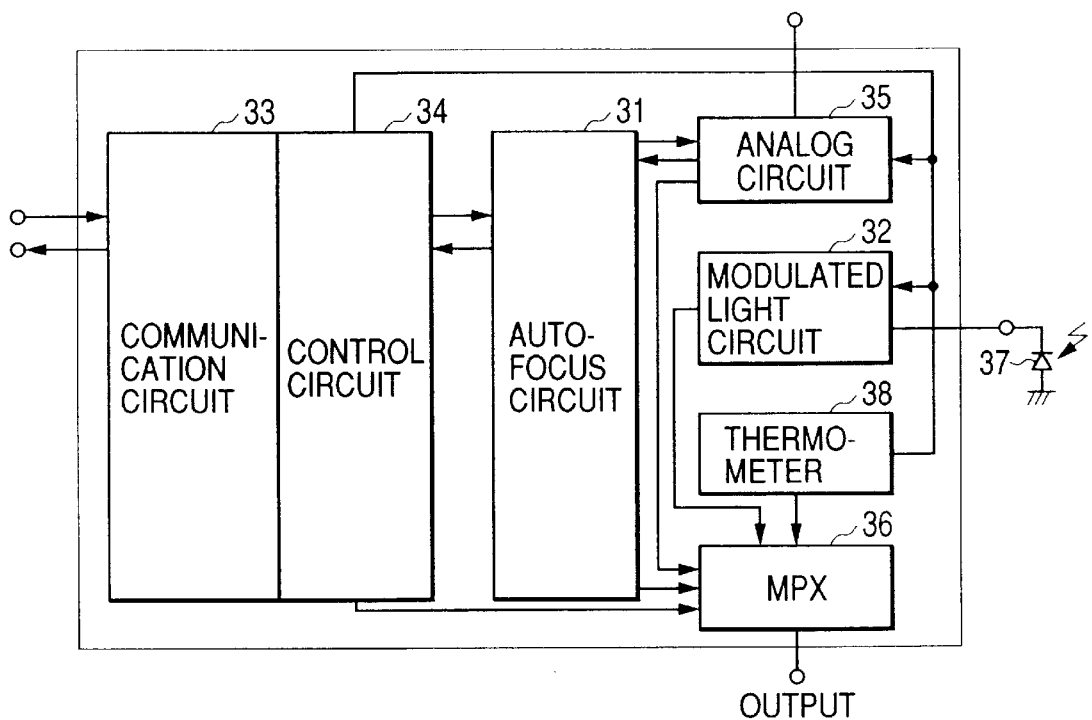
FIG. 6 is a block diagram showing the arrangement of the fourth embodiment.

FIG. 6 shows the arrangement of a multifunctional CMOS sensor as the fourth embodiment of the present invention. In the fourth embodiment, a thermometer circuit is further integrated in the arrangement of the third embodiment.

Figure 7:
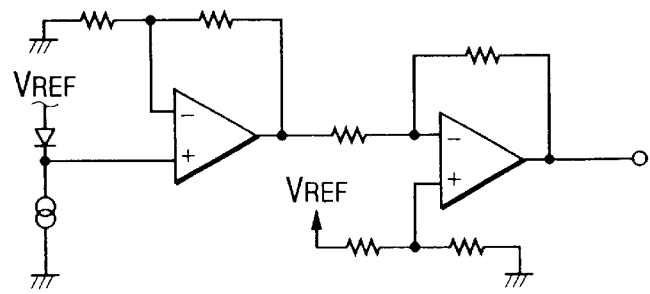
FIG. 7 is a circuit diagram showing a thermometer circuit.

As can be understood from equations (8) and (9), an output from the modulated light sensor changes depending on the temperature due to the temperature dependency of the threshold value $V_T$. To modulate light at high precision requires correction in accordance with changes in the temperature, so that the temperature must be accurately measured. FIG. 7 shows an example of a thermometer circuit using the temperature characteristics of the diode. In the fourth embodiment, because the thermometer is formed on the same substrate as the modulated light circuit, the temperature can be accurately measured. Because no other chip is required, the cost may be reduced.

The fourth embodiment can implement at a low cost a multifunctional CMOS sensor capable of high-precision light modulation and autofocusing.

As has been described above, a logarithmic compression circuit and expansion/integration circuit can be achieved by a CMOS process, so that a lower-cost photoelectric conversion apparatus and modulated light circuit than the prior art can be attained.

The modulated light circuit can be integrated in a CMOS sensor such as a CMOS autofocus sensor, and thus a small-size, low-cost camera having a small number of components can be obtained.

Many widely different embodiments of the present invention may be constructed without departing from the spirit and scope of the present invention. It should be understood that the present invention is not limited to the specific embodiments described in the specification, except as defined in the appended claims.

What is claimed is:

1. A signal processing apparatus comprising:
   a photoelectric conversion element; and
   a compression device which logarithmically compresses an output from said photoelectric conversion element,
   wherein said compression device includes a MOS transistor, where a gate and drain of said MOS transistor are connected to each other, and a source potential and a well potential of said MOS transistor are provided with a common potential.

2. An apparatus according to claim 1, wherein said MOS transistor operates in a subthreshold region.

3. A signal processing apparatus comprising:
   a photoelectric conversion element;
   a compression device which logarithmically compresses an output from said photoelectric conversion element; and
   an integral device which integrates an output from an expansion device,
   wherein a transistor which performs logarithmic compression in said compression device and a transistor which performs exponential expansion in said expansion device are MOS transistors, and
   wherein a gate and a drain of the MOS transistor of said compression device are connected to each other, and a source potential and a well potential of the MOS transistor of said compression device are provided with a common potential.

4. An apparatus according to claim 3, wherein each of said MOS transistors operates in a subthreshold region.

5. A signal processing apparatus formed by a CMOS process on a single semiconductor substrate, comprising:
   a modulated light circuit including:
      a compression device which logarithmically compresses an output from a photoelectric conversion device;
      an expansion device which exponentially expands an output from said compression device; and
      an integral device which integrates an output from said expansion device,
      wherein said compression device includes a MOS transistor, where a gate and a drain of said MOS transistor are connected to each other, and a source potential and a well potential of said MOS transistor are provided with a common potential; and
   a focus adjustment circuit,
   wherein said modulated light circuit and said focus adjustment circuit are configured on said single semiconductor substrate formed by the CMOS process.

6. An apparatus according to claim 5, further comprising:
   a thermometer circuit,
   wherein an output of said modulated light circuit is corrected based on an output from said thermometer circuit.

7. An apparatus according to claim 5, further comprising:
   a communication circuit which communicates externally; and
   a control circuit which controls said modulated light circuit, said focus adjustment circuit, and said communication circuit,
   wherein said communication circuit and said control circuit are configured on said single semiconductor substrate.

8. An apparatus according to claim 5, further comprising:
   a communication circuit which communicates externally; and
   a control circuit which controls said modulated light circuit, said focus adjustment circuit, a thermometer circuit, and said communication circuit,
   wherein said communication circuit and said control circuit are configured on said single semiconductor substrate.

9. An apparatus according to claim 5, wherein said modulated light circuit senses electronic flash light.

10. A signal processing apparatus comprising:
    a photoelectric conversion element;
    a compression device which includes a MOS transistor that compresses logarithmically an output of said photoelectric conversion element;
    an expansion device which includes a MOS transistor and expands exponentially an output of said compression device, where a gate and a drain of said MOS transistor of said expansion device are connected to each other;
    a feedback MOS transistor, wherein a source of said feedback MOS transistor is connected to a source of said MOS transistor of said expansion device; and
    an operational amplifier,
    wherein an output of said operational amplifier is connected to a gate of said feedback MOS transistor, one input terminal of said operational amplifier is supplied with a predetermined voltage, and an other input terminal of said operational amplifier is connected to the source of said feedback MOS transistor.

11. A signal apparatus formed by a CMOS process on a single semiconductor substrate, comprising:
    a modulated light circuit including:
       a compression device which includes a CMOS transistor and compresses logarithmically an output of a photoelectric conversion element;
       an expansion device which includes a CMOS transistor and expands exponentially an output of said compression device, where a gate and a drain of said MOS transistor of said expansion device are connected to each other;
       a feedback MOS transistor, wherein a source of said feedback MOS transistor is connected to a source of said MOS transistor of said expansion device; and
       an operational amplifier,
       wherein an output of said operational amplifier is connected to a gate of said feedback MOS transistor, one input terminal of said operational amplifier is supplied with a predetermined voltage, and an other terminal of said operational amplifier is connected to the source of said feedback MOS transistor; and
    a focus adjustment circuit,
    wherein said modulated light circuit and said focus adjustment circuit are configured on said single semiconductor substrate formed by the CMOS process.

12. An apparatus according to claim 11, further comprising:
    a thermometer circuit,
    wherein an output of said modulated light circuit is corrected based on an output from said thermometer circuit.

* * * * *